(12) United States Patent
Hawes

(10) Patent No.: US 9,141,380 B2
(45) Date of Patent: Sep. 22, 2015

(54) METHOD AND SYSTEM FOR VISUALIZATION OF LARGE CODEBASES

(71) Applicant: Oracle International Corporation, Redwood City, CA (US)

(72) Inventor: Nathan John Hawes, Kenmore (AU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/210,001

(22) Filed: Mar. 13, 2014

(65) Prior Publication Data

US 2014/0325477 A1 Oct. 30, 2014

Related U.S. Application Data

(60) Provisional application No. 61/817,642, filed on Apr. 30, 2013.

(51) Int. Cl.
*G06F 9/44* (2006.01)

(52) U.S. Cl.
CPC ........................................ *G06F 8/70* (2013.01)

(58) Field of Classification Search
CPC ............................................ G06F 8/10–8/54
USPC ................................................. 717/100–123
See application file for complete search history.

(56) References Cited

U.S. PATENT DOCUMENTS

| | | | | |
|---|---|---|---|---|
| 4,752,889 A | * | 6/1988 | Rappaport et al. | 706/11 |
| 5,546,529 A | * | 8/1996 | Bowers et al. | 715/848 |
| 7,512,929 B2 | * | 3/2009 | Sangal et al. | 717/100 |
| 7,627,671 B1 | * | 12/2009 | Palma et al. | 709/224 |
| 7,716,635 B1 | * | 5/2010 | Jeschke | 717/109 |
| 7,966,356 B2 | * | 6/2011 | Sangal et al. | 707/829 |
| 8,443,074 B2 | * | 5/2013 | Bahl et al. | 709/224 |
| 2003/0056204 A1 | * | 3/2003 | Broussard | 717/140 |
| 2007/0106975 A1 | * | 5/2007 | DeLine | 717/106 |
| 2012/0005647 A1 | * | 1/2012 | Dolby et al. | 717/105 |

OTHER PUBLICATIONS

Simmhan, Yogesh, et al. "Building the trident scientific workflow workbench for data management in the cloud." Advanced Engineering Computing and Applications in Sciences, 2009. ADVCOMP'09. Third International Conference on. IEEE, 2009, pp. 41-50.*

Kunisetty, Sunil K. Workflow modeling and simulation using an extensible object—oriented knowledge base management system. MS thesis. University of Florida, 1996, pp. 1-60.*

Gomaa, Hassan, and Mazen Saleh. "Feature driven dynamic customization of software product lines." Reuse of Off-the-Shelf Components. Springer Berlin Heidelberg, 2006, pp. 58-72.*

* cited by examiner

*Primary Examiner* — Satish Rampuria
(74) *Attorney, Agent, or Firm* — Osha Liang LLP

(57) ABSTRACT

A method for visualizing a codebase includes receiving a dependency graph of the codebase, the dependency graph having nodes and dependencies between the nodes, receiving an abstraction hierarchy of the codebase with abstraction levels, generating, based on the dependency graph and the abstraction hierarchy, a hierarchical graph, positioning each of the nodes on a code map using the hierarchical graph one abstraction level at a time, generating at least one contiguous surface for the code map with a portion of the nodes, and rendering the code map.

20 Claims, 7 Drawing Sheets

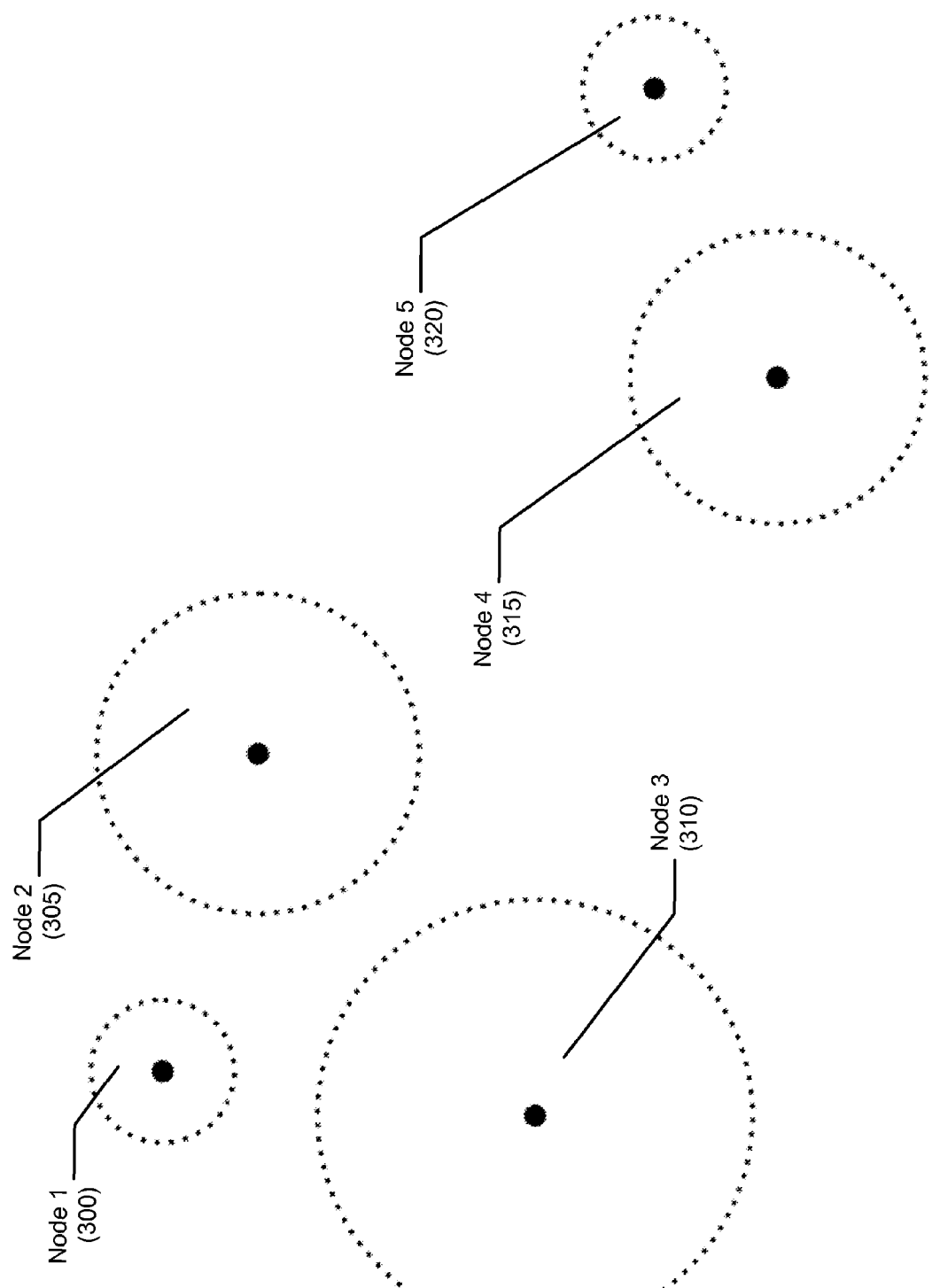

METHOD AND SYSTEM FOR VISUALIZATION OF LARGE CODEBASES

CROSS-REFERENCE TO RELATED APPLICATIONS

This application is a non-provisional patent application of U.S. Provisional Patent Application Ser. No. 61/817,642, filed on Apr. 30, 2013, and entitled: "Method and System for Visualization of Large Codebases." Accordingly, this non-provisional patent application claims priority to U.S. Provisional Patent Application Ser. No. 61/817,642 under 35 U.S.C. §119(e). U.S. Provisional Patent Application Ser. No. 61/817,642 is hereby incorporated in its entirety.

BACKGROUND

The size of code bases can be extremely large—tens of millions of lines of code—or more. The techniques used to represent smaller code bases are unable to scale to industrial-sized code bases, due to an inability to represent the code base in a meaningful way, large amounts of time needed to generate a visualization, or for various other reasons. Visualization of large code bases would greatly improve the work of programmers and others who rely on large codebases.

SUMMARY OF INVENTION

In general, in one or more aspects, the invention relates to a method for visualizing a codebase. The method comprises: receiving a dependency graph of the codebase, wherein the dependency graph comprises a plurality of nodes and a plurality of dependencies between the plurality of nodes; receiving an abstraction hierarchy of the codebase, wherein the abstraction hierarchy comprises a plurality of abstraction levels; generating, based on the dependency graph and the abstraction hierarchy, a hierarchical graph; positioning each of the plurality of nodes on a code map using the hierarchical graph one abstraction level of the plurality of abstraction levels at a time; generating at least one surface for the code map, wherein the at least one surface comprises a portion of the plurality of nodes, and wherein the surface is contiguous; and rendering the code map.

In general, in one or more aspects, the invention relates to a system for visualizing a codebase. The system comprises a server comprising: a computer processor, a data repository storing the codebase, and a memory, the memory storing instructions for a codebase visualization application, which, when executed by the computer processor, comprises functionality to: receive a dependency graph of the codebase, wherein the dependency graph comprises a plurality of nodes and a plurality of dependencies between the plurality of nodes; receive an abstraction hierarchy of the codebase, wherein the abstraction hierarchy comprises a plurality of abstraction levels; generate, based on the dependency graph and the abstraction hierarchy, a hierarchical graph; position each of the plurality of nodes on a code map using the hierarchical graph one abstraction level of the plurality of abstraction levels at a time; generate at least one surface for the code map, wherein the at least one surface comprises a portion of the plurality of nodes, and wherein the surface is contiguous; and render the code map.

In general, in one or more aspects, the invention relates to a non-transitory computer-readable medium (CRM) storing a plurality of instructions for visualizing a codebase. The plurality of instructions comprise functionality to: receive a dependency graph of the codebase, wherein the dependency graph comprises a plurality of nodes and a plurality of dependencies between the plurality of nodes; receive an abstraction hierarchy of the codebase, wherein the abstraction hierarchy comprises a plurality of abstraction levels; generate, based on the dependency graph and the abstraction hierarchy, a hierarchical graph; position each of the plurality of nodes on a code map using the hierarchical graph one abstraction level of the plurality of abstraction levels at a time; generate at least one surface for the code map, wherein the at least one surface comprises a portion of the plurality of nodes, and wherein the surface is contiguous; and render the code map.

BRIEF DESCRIPTION OF DRAWINGS

FIGS. 3A, 3B, 3C, and 3D show an example in accordance with one or more embodiments of the invention.

DETAILED DESCRIPTION

Figure 1:
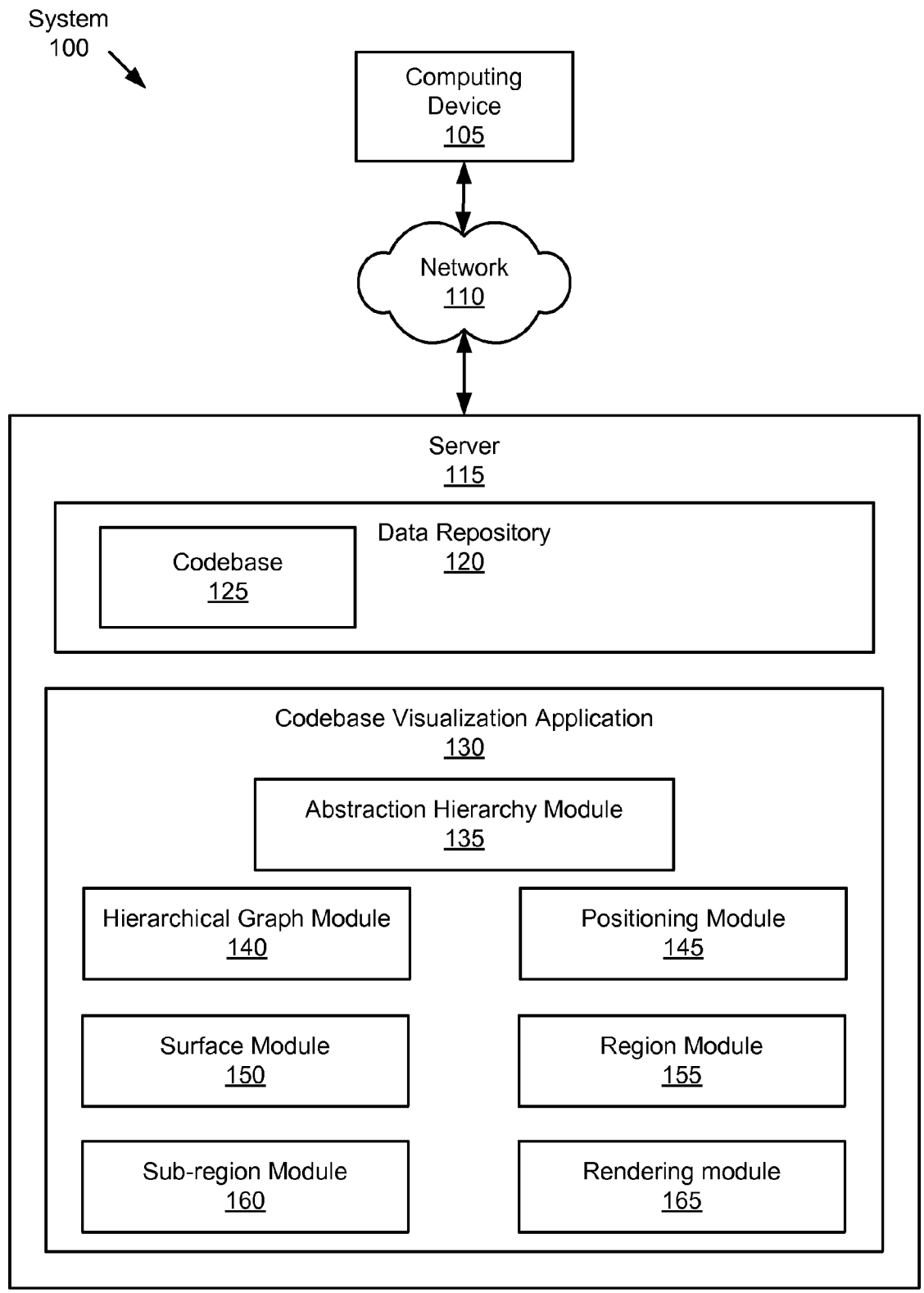
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for visualizing a codebase. Specifically, a dependency graph and an abstraction hierarchy of the codebase are received, and a hierarchical graph is generated using the dependency graph and the abstraction hierarchy. Then, using the hierarchical graph, nodes are positioned on a code map. A surface is then generated for the code map, and is divided into regions and sub-regions. Finally the code map is rendered and displayed to the user.

FIG. 1 shows a schematic diagram of a system (100) in accordance with one or more embodiments of the invention. As shown in FIG. 1, the system (100) includes a computing device (105), a network (110), a server (115), a data repository (120), a codebase (125), a codebase visualization application (130), an abstraction hierarchy module (135), a hierarchical graph module (140), a positioning module (145), a surface module (150), a region module (155), a sub-region module (160), and a rendering module (165). The computing device (105) may be any computing device including, but not limited to a desktop computer, a laptop computer, a smart phone, a cell phone, a handheld gaming device, a cable box, a server, a blade, smart computing glasses, etc. The computing device (105) may have a variety of applications installed, such as an integrated development environment, or other application for programming. In one or more embodiments of the invention, the computing device (105) includes a local copy of a codebase (125). Further, the computing device (105) may be multiple devices, such as a group of connected computers accessing shared data, as in an office environment. In one or more embodiments of the invention, the network (110) is a wide area network (WAN), such as the Internet, a local area network (LAN), and/or any other network using wired and or wireless communication.

In one or more embodiments of the invention, the server (115) is any computing device including, but not limited to a desktop computer, a laptop computer, a smart phone, a cell phone, a handheld gaming device, a cable box, a server, a blade, smart computing glasses, etc. The server (115) includes a data repository (120). The data repository (120) is any storage device including, but not limited to memory, hard drives, cloud storage, removable storage media, optical drives, and/or any other storage device or component. In one or more embodiments of the invention, the data repository (120) includes a codebase (125). In one or more embodiments of the invention, a codebase (125) is a collection of source code used to build a component, module, application, program, etc. The codebase (125) may include any number of files and/or any number of programming languages. Typically the codebase (125) includes only human written source code (e.g., not binary files, etc.). Alternatively, the codebase (125) may include only computer-generated code, or some combination of human written and/or computer generated code.

In one or more embodiments of the invention, a codebase visualization application (130) includes functionality for creating a visual representation of a codebase that is similar to a world map or other symbolic metaphor useful for visualization. Specifically, the visualization of the codebase may take the shape of a world map, with "continents," "islands," "countries," and "states" or other meaningful subdivision, thereby providing a user with an intuitive way to understand the complex relationships present in a large codebase. Specifically, the codebase visualization application (130) includes functionality to receive a dependency graph of the code base, receive and/or generate an abstraction hierarchy, generate the code map, and to display the code map to a user in many different ways, as described below. Further, the codebase visualization application (130) includes functionality for searching the code map. A dependency graph is a directed graph that represents the dependencies between objects. Each node in the dependency graph may represent an individual object, method, class, or other suitable unit of the codebase. In one or more embodiments of the invention, the dependency graph may be received from any suitable source, such as the computing device (105), and/or may have been generated locally on the server (115).

In one or more embodiments of the invention, an abstraction hierarchy module (135) includes functionality to generate an abstraction hierarchy. An abstraction hierarchy is a graph/hierarchy (such as a tree or other suitable structure), that associates the nodes of the dependency graph into groupings. The groupings may be of any size, and the criteria for grouping may be any suitable factor or element. For example, if each node of the dependency graph represents a method, then the abstraction hierarchy may group the methods into classes, the classes into packages, etc., until there is a single node at the "top" of the abstraction hierarchy. Optionally, in one or more embodiments of the invention, the abstraction hierarchy module (135) includes functionality to receive an abstraction hierarchy from a source, such as a computing device (105) or other suitable source. It will be apparent to one of ordinary skill in the art, having the benefit of this disclosure, that the abstraction hierarchy may have any number of levels and, as such, the invention should not be limited to the above example.

In one or more embodiments of the invention, a hierarchical graph module (140) includes functionality to generate a hierarchical graph. In one or more embodiments of the invention, the hierarchical graph is generated from a dependency graph and an abstraction hierarchy, and has the properties that, when discussing a particular node, X: the node above X is X's parent; the node(s) below X is/are X's children; the node(s) at the same level that have the same parent are X's sibling; and the node(s) at the same level that share an edge are X's neighbors.

In one or more embodiments of the invention, a positioning module (145) includes functionality to position nodes on the code map. In one or more embodiments of the invention, the nodes may be positioned on the code map using an energy minimization approach. When using an energy minimization approach, positioning module (145) may treat each node of the graph(s) as circle with a radius. The radius may be set to any suitable size. For example, the radius may be the number of lines of code of the source entity (e.g., a function, a module, etc.) which the node represents. In one or more embodiments of the invention, the energy minimization approach may use the following model: neighboring nodes contribute attraction energy proportional to the distance they are apart; every pair of nodes contribute repulsion energy inversely proportional to the distance they are apart, with a sharp increase when the nodes begin to overlap; and every node contributes gravitation energy proportional to the distance they are from their parent.

In one or more embodiments of the invention, the above described model may then be used to compute the positions of the various nodes by first giving the nodes an initial position, and calculating the energy of the initial configuration. Then, several new configurations may be identified and the energy calculated, and the configuration with the smallest energy value may be selected. In one or more embodiments of the invention, positioning module (145) includes functionality to set each of these variables to any suitable value. Alternatively, the nodes may be positioned using any other suitable approach. In one or more embodiments of the invention, positioning module (145) may simply place the root node of the abstraction hierarchy at position (0,0) on the code map. Then, positioning module (145) may lay out each subsequent level based on the energy minimization approach.

In one or more embodiments of the invention, surface module (150) includes functionality to generate shape(s) for the code map based on the nodes positioned by positioning module (145). In other words, to compare the functionality of surface module (150) to a world map, surface module (150) is responsible for generating the islands or landmass of the code map. The shapes of the landmass are generated by surface module (150) using implicit surface generation, in which the shapes generated are implicitly defined by the position and radius of the graph nodes.

In one or more embodiments of the invention, a region module (155) includes functionality to divide the surface(s) generated by a surface module (150) into regions. In other words, to compare the functionality of the region module (155) to a world map, the region module (155) divides the islands/landmass into countries. In one or more embodiments of the invention, the sub-region module (160) includes functionality to divide the regions generated by the region module (155) into sub-regions. In other words, to compare the sub-region module (160) to a world map, the sub-region module (160) may divide countries into states, states into counties, and so on.

In one or more embodiments of the invention, the rendering module (165) includes functionality to render the code map. The code map may be rendered onto tiles. Further, the rendering module (165) includes functionality to render a code map at various levels of detail, (i.e., surface/region/sub-region, etc.) and with a variety of different overlays useful for visually examining a codebase.

Figure 2:
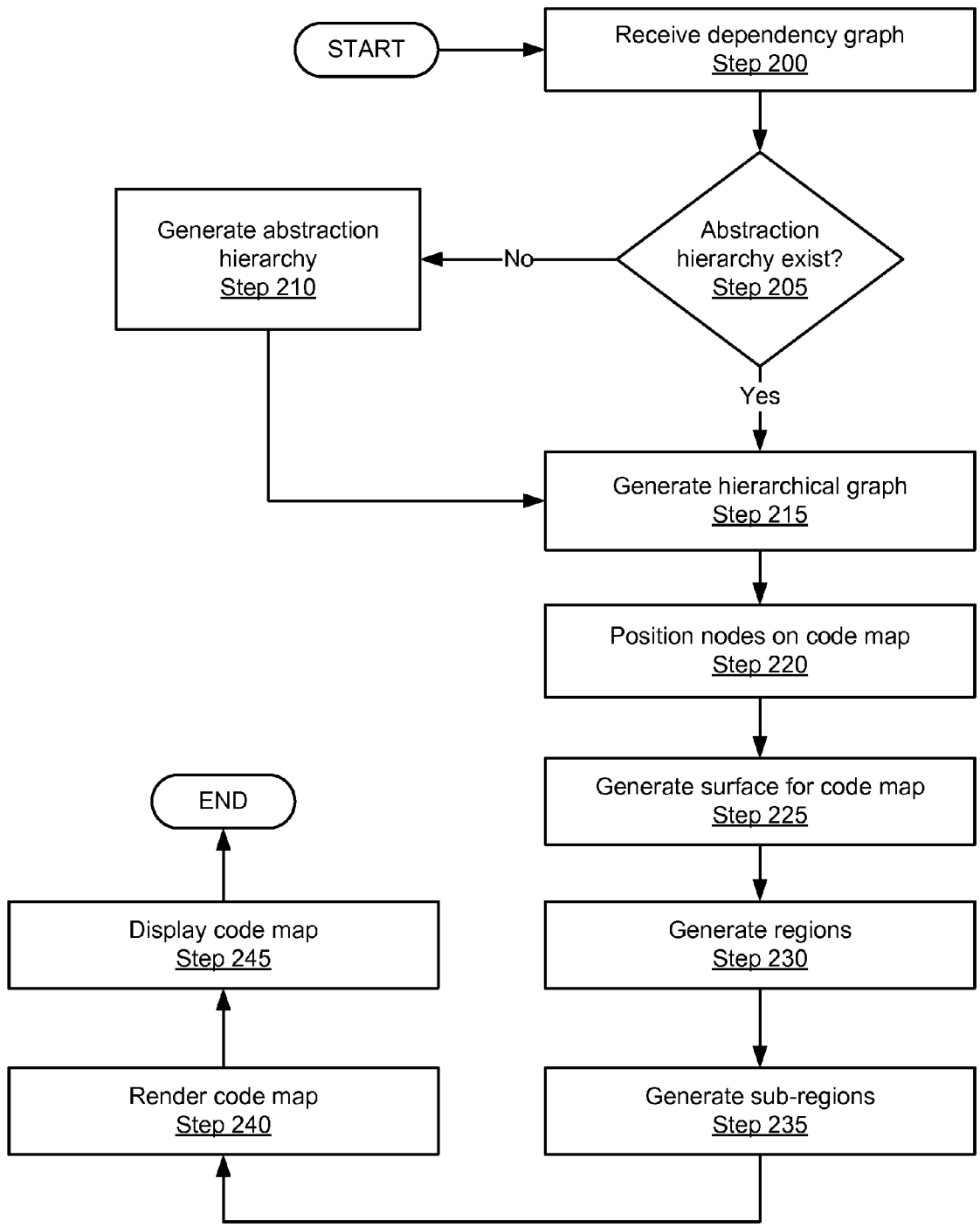
FIG. 2 shows a flowchart in accordance with one or more embodiments of the invention.

FIG. 2 shows a flowchart in accordance with one or more embodiments of the invention. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In Step 200, a dependency graph is received, in accordance with one or more embodiments of the invention. The dependency graph may be received from any suitable source, and may be received in any format now known or later developed.

In Step 205, a determination is made whether an abstraction hierarchy exists, in accordance with one or more embodiments of the invention. If an abstraction hierarchy exists, the method proceeds to Step 215. If an abstraction hierarchy does not exist, the method proceeds to Step 210.

In Step 210, an abstraction hierarchy is generated, in accordance with one or more embodiments of the invention. The abstraction hierarchy may be generated using a graph clustering algorithm on the dependency graph. The graph clustering algorithm clusters together highly-connected sets of nodes to form a coarser version of the dependency graph, and recursively repeats the process on the new version(s) of the graph until only a single node remains. Thus, an abstraction hierarchy of higher-level groupings is formed from the dependency graph.

In Step 215, a hierarchical graph is generated, in accordance with one or more embodiments of the invention. The hierarchy graph may be generated by summarizing the edges in the dependency graph through each of the levels of the abstraction hierarchy, thereby giving a series of graphs - from a highly detailed input graph through coarser and coarser abstractions until the single node root node is reached.

In Step 220, nodes are positioned on the code map, in accordance with one or more embodiments of the invention. The nodes may be positioned on the code map on an level by level basis, beginning with the highest level of abstraction. In one or more embodiments of the invention, the layout of individual levels is treated as an energy minimization problem. In one or more embodiments of the invention, the energy minimization may be solved as described above, with respect to FIG. 1, or in any other manner now known or later developed.

Specifically, an energy model is defined for the graph. The energy model allows nodes to have a user-specified radius that are unable to overlap. Alternatively, the nodes may have a set radius and/or be able to overlap. Further, in one or more embodiments of the invention, neighboring nodes contribute attraction energy proportional to the distance they are apart. Alternatively, the attraction energy may be set by the user, use a different forum, or use any other suitable standard. In one or more embodiments of the invention, every pair of nodes contributes repulsion energy, inversely proportional to the distance they are apart. Alternatively, the repulsion energy may be measured using a different formula and/or set by the user. In one or more embodiments of the invention, when the nodes begin to overlap, the repulsion energy increases greatly. The level of increase may be controlled by the user. In one or more embodiments of the invention, every node contributes gravitation energy, proportional to the distance they are from their parent. Alternatively, a different formula may be used, and may be set by the user.

For example, in a model with 100% gravitation energy and 0% attraction energy, the positioning of the nodes are as close as possible to their parent nodes, resulting in a clear display of the abstraction hierarchy. As a contrast, if a model used 0% gravitation energy and 100% attraction energy, the nodes are positioned close to their neighbors and ignore the abstraction hierarchy.

In Step 225, a surface is generated for the code map, in accordance with one or more embodiments of the invention. In one or more embodiments of the invention, the surfaces may be generated using a weighted Delaunay triangulation of the positioned nodes. Any triangulation edge that exceeds a threshold distance is ignored, leaving edges between closely positioned nodes only. In one or more embodiments of the invention, the nodes being traced around are positioned at the vertices between edge pairs of valid edges, and may be traced using circular arcs around the nodes and Bezier curves between them. Alternatively, any other shape or method of tracing now known or later developed may be used.

Additionally, the shapes may be traced such that the valid edge(s) being followed are to the left in the direction of tracing resulting in surfaces that are defined in the opposite orientation to holes in the surfaces. Alternatively, the shapes may be traced such that the valid edge(s) being followed are to the right in the direction of tracing. Thus, the surfaces generated each contain multiple nodes and are comparable to islands or landmass on a world map, and may be subdivided in later steps. It will be apparent to one of ordinary skill in the art, having the benefit of this disclosure, that the surfaces may be generated using many different shapes and methods and may contain any number of nodes and, as such, the invention should not be limited merely to the above examples.

In Step 230, regions are generated for the code map, in accordance with one or more embodiments of the invention. The region may be generated on a node by node basis by enclosing all points in the surfaces generated in Step 225 that are closer to a given node than any other node. In one or more embodiments of the invention, the region is generated based on a Voronoi region/Voronoi diagram. The Voronoi region of each node is the shape enclosing all points in the diagram space that are closer to that node than any other node, while the Voronoi diagram is the union of all the Voronoi regions. By bounding nodes' Voronoi region by their containing surface the space between nodes may be divided in such a way that the significance of their radius and size is maintained. Alternatively, any other method now known or later developed may be used to generate the region(s). Importantly, in one or more embodiments of the invention, the regions preserve the significance of the radius and size of each node, allowing users who view the code map to quickly discern information and relationships amongst the nodes.

In Step 235, sub-regions are generated for the code map, in accordance with one or more embodiments of the invention. The sub-regions may be generated recursively, by proportionally sub-dividing the regions based on the target area of the child nodes in the abstraction hierarchy. Specifically, the child nodes are first positioned within the enclosed region(s) of their parent(s). Then, the bounded Voronoi diagram of the positioned nodes is computed, and the error between the actual areas of the sub-regions and their target areas is computed. If the error is within a threshold, the loop ends. Otherwise, each node is moved towards the center of mass of the node's associated Voronoi region and the radius of the node is adjusted up or down to increase/decrease the area of the region. When the process ends, it is performed again for each sub-region until the bottom of the abstraction hierarchy is reached. The above described steps may be referred to as a Voronoi treemap algorithm, or a Voronoi treemap. It will be apparent to one of ordinary skill in the art, having the benefit of this disclosure, that Step 235 may be performed any number of times and, as such, the invention should not be limited to the above example.

In Step 240, the code map is rendered, in accordance with one or more embodiments of the invention. The code map may first be pre-rendered onto a series of 512×512 pixel tiles in a quad-tree arrangement. Initially, the entire code map is rendered in a single tile, representing the lowest level of zoom. Then, the entire code map is rendered over 4 tiles, representing the second zoom level. The entire code map may also be rendered over 16 tiles, representing the third level of zoom. In one or more embodiments of the invention the code map may have any number of levels of zoom, and may be rendered over any number of tiles. Specifically, the code map may allow different levels of zoom (e.g., 100%, 250%, 400%, etc) independently of the level of abstraction being shown (e.g., "country" level, "continent" level, etc.). In one or more embodiments of the invention, depending on the level of zoom, the map may display labels, features, or other aspects from different levels in the abstraction hierarchy. Further, in one or more embodiments of the invention, the code map may be rendered on pixel tiles of any suitable size, such as 128× 128, 256×256, 640×640, or any other size as desired. Further, the second level, and all subsequent levels, need not be multiples of four (i.e., the second level may span 2, 6, 8, 12, or any other number of tiles). In one or more embodiments of the invention, the above described tiles may be rendered on the fly (i.e., as the user zooms and pans around the map). Alternatively, the tiles may be rendered as a singe vector-based image using, for example, Scalable Vector Graphics (SVG). It will be apparent to one of ordinary skill in the art that the code map may be rendered in many different ways and, as such, the invention should not be limited to the above examples.

In Step 245, the code map is displayed, in accordance with one or more embodiments of the invention. The code map may be displayed on any suitable device using any suitable program and/or method. Specifically, the code map may be displayed within a web browser. In one or more embodiments of the invention, users/viewers of the code map are able to pan, zoom, and perform other actions typical of online mapping services. Additionally, various information can be highlighted or overlaid on the code map. For example, cyclomatic complexity may be overlaid on the regions via color, bug locations may be overlaid using icons or any other method, and dependency edges may be overlaid to show how strongly related regions are nearby. It will be apparent to one of ordinary skill in the art, having the benefit of this disclosure, that the code map may be displayed in many different manners and many different things may be overlaid on the code map and, as such, the invention should not be limited to the above examples.

In one or more embodiments of the invention, the code map is searchable. The code map may be searched in any way now known or later developed, and any information viewable in the code map, whether in overlays or the code map itself, is searchable. It will be apparent to one of ordinary skill in the art, having the benefit of this disclosure, that there are many ways to search the code map and, as such, the invention should not be limited to the above example.

The above described invention is, in particular, helpful for understanding and visualizing large codebases. Further, the invention scales to large codebases (in the range of millions to tens of millions of lines of code, or higher) extremely well. Further, because the displayed code map loosely resembles the shapes and forms commonly seen in world maps, users have an intuitive sense of how closely related things displayed on the code map are, based on their proximity. Additionally, displaying a code map using the method of the invention allows for easier navigation due to visual landmarks (such as distinctive shape and positions of landmasses). It will be apparent to one of ordinary skill in the art, having the benefit of this disclosure, that many other things are easily viewable in a code map and, as such, the invention should not be limited to the above examples.

Figure 3B:
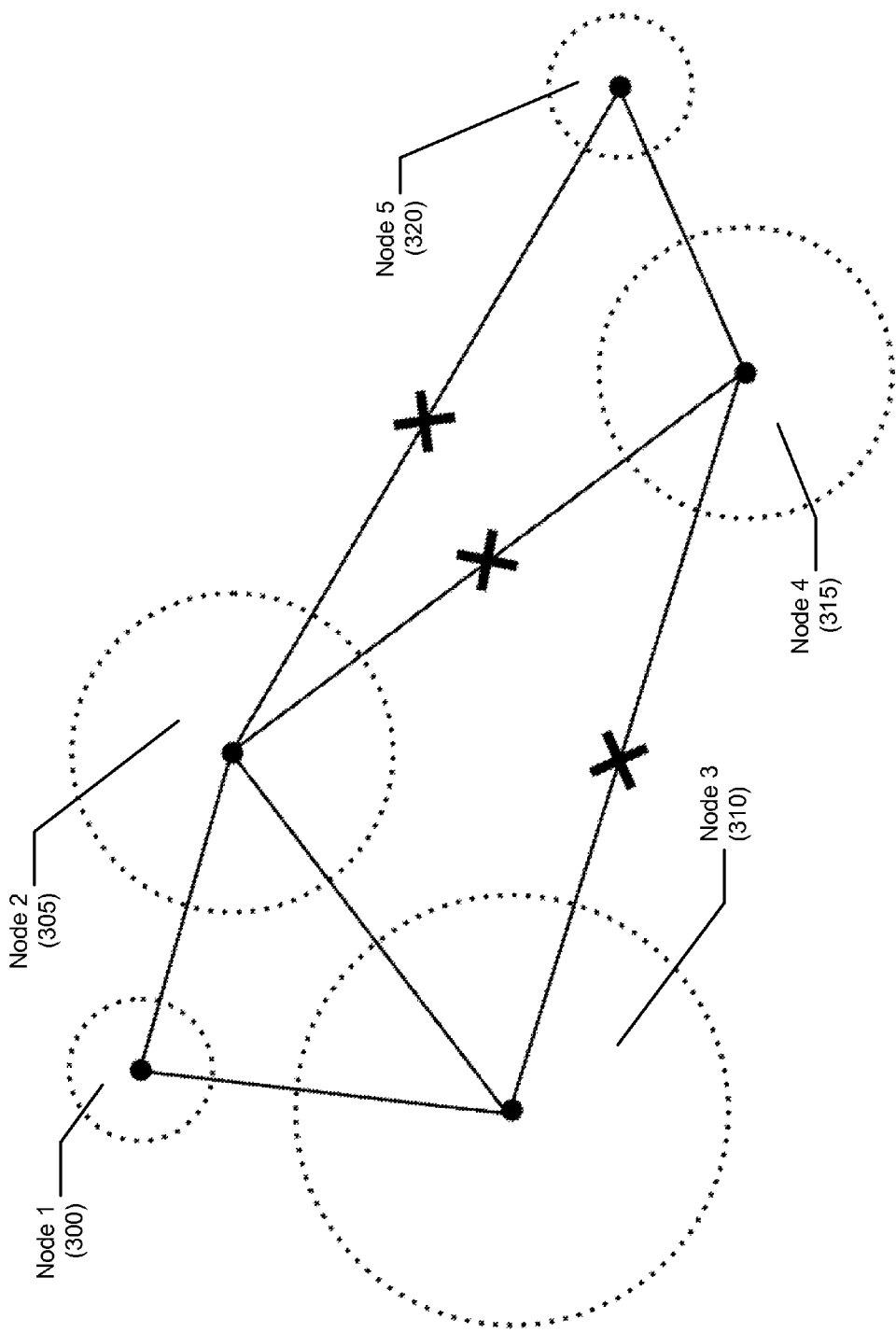
Figure 3C:
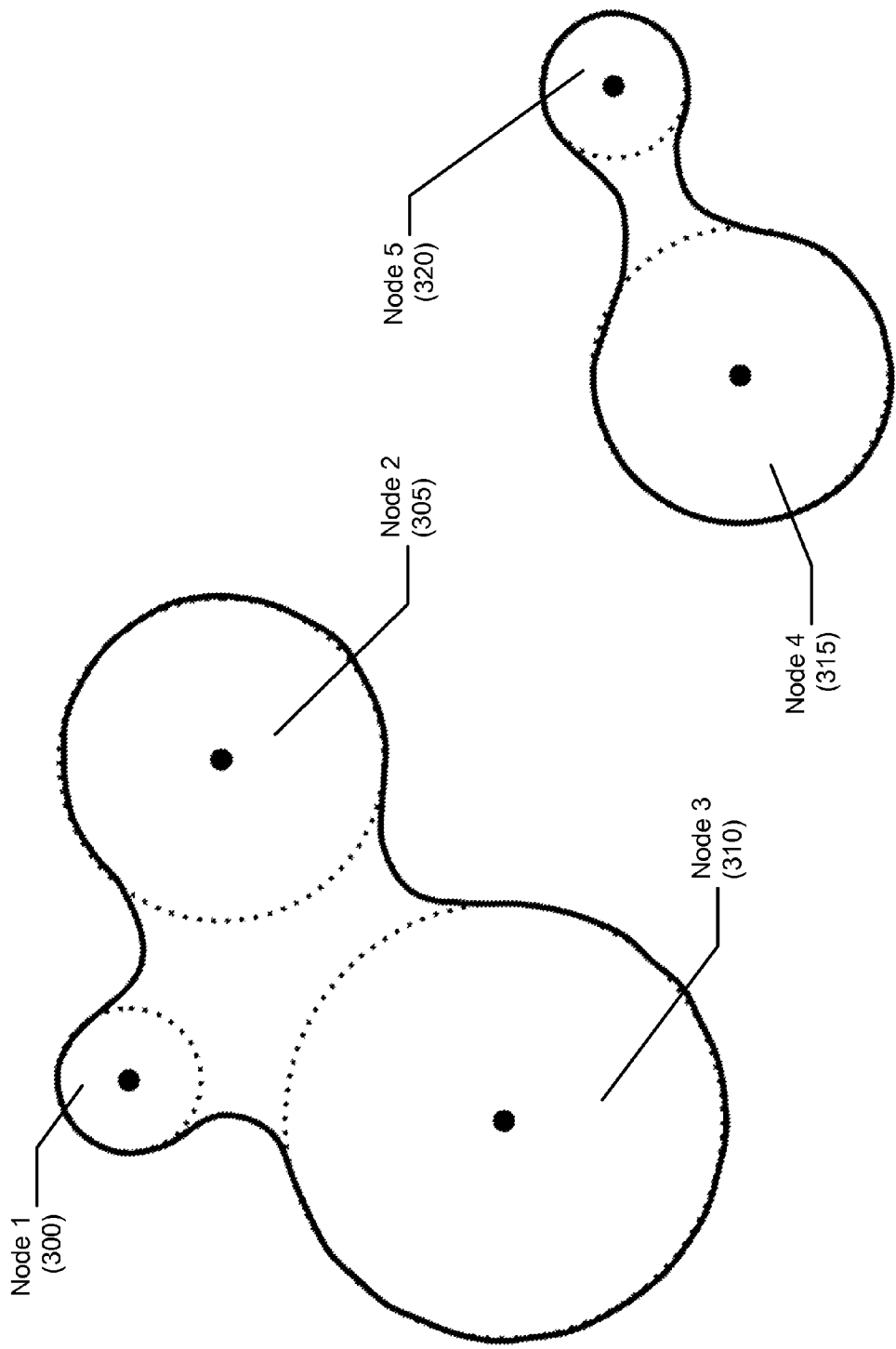

FIGS. 3A, 3B, and 3C show an example in accordance with one or more embodiments of the invention. Specifically, FIG. 3A shows node 1 (300), node 2 (305), node 3 (310), node 4 (315), and node 5 (320) immediately after they have been placed on a code map. Thus, no shapes or landmasses have been formed around the nodes yet. The nodes (i.e., node 1 (300), node 2 (305), node 3 (310), node 4 (315), and node 5 (320)) were placed using an energy minimization approach which, in the interests of simplicity, is not recreated in this example. Further, for ease of demonstration, the nodes are represented as points in FIG. 3A. The nodes (i.e., node 1 (300), node 2 (305), node 3 (310), node 4 (315), and node 5 (320)) also have radii, as shown by the dotted lines surrounding the points, which may be set using any of a variety of factors and/or calculations, as described above.

Moving to FIG. 3B, node 1 (300), node 2 (305), node 3 (310), node 4 (315), and node 5 (320) are again shown, but in an intermediate stage of a Delaunay triangulation. Specifically, triangulation edges between the various points with a length greater than a threshold have been invalidated. The invalidated edges are marked with an "X" in FIG. 3B, while the valid edges do not have an "X."

Subsequently, in FIG. 3C, boundaries are traced around sets of nodes with valid triangulation edges, with Bezier curves between the edges, as needed. Specifically, a first set of nodes is formed with node 1 (300), node 2 (305), and node 3 (310), while node 4 (315) and node 5 (320) form a second set of nodes. These sets of nodes resemble a continent or landmass.

Figure 3D:
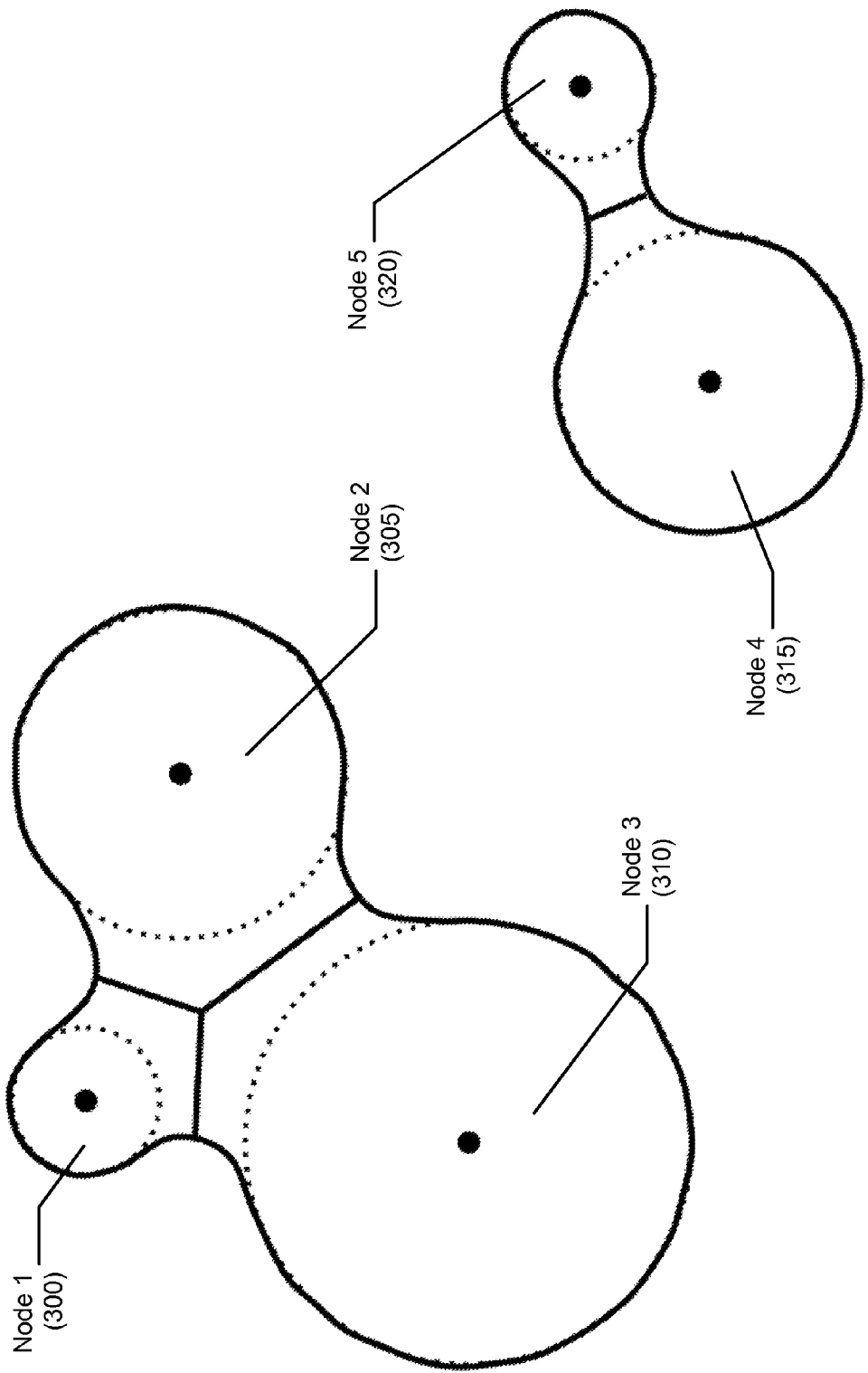

Finally, in FIG. 3D, the landmasses created in FIG. 3C are subdivided into regions using a Voronoi diagram, and bounding each node's Voronoi region by its containing surface. Comparing FIG. 3D to a world map, "countries" have been designated. Optionally, the regions may be further subdivided into "states" or other smaller units recursively using a Voronoi treemap algorithm.

Figure 4:
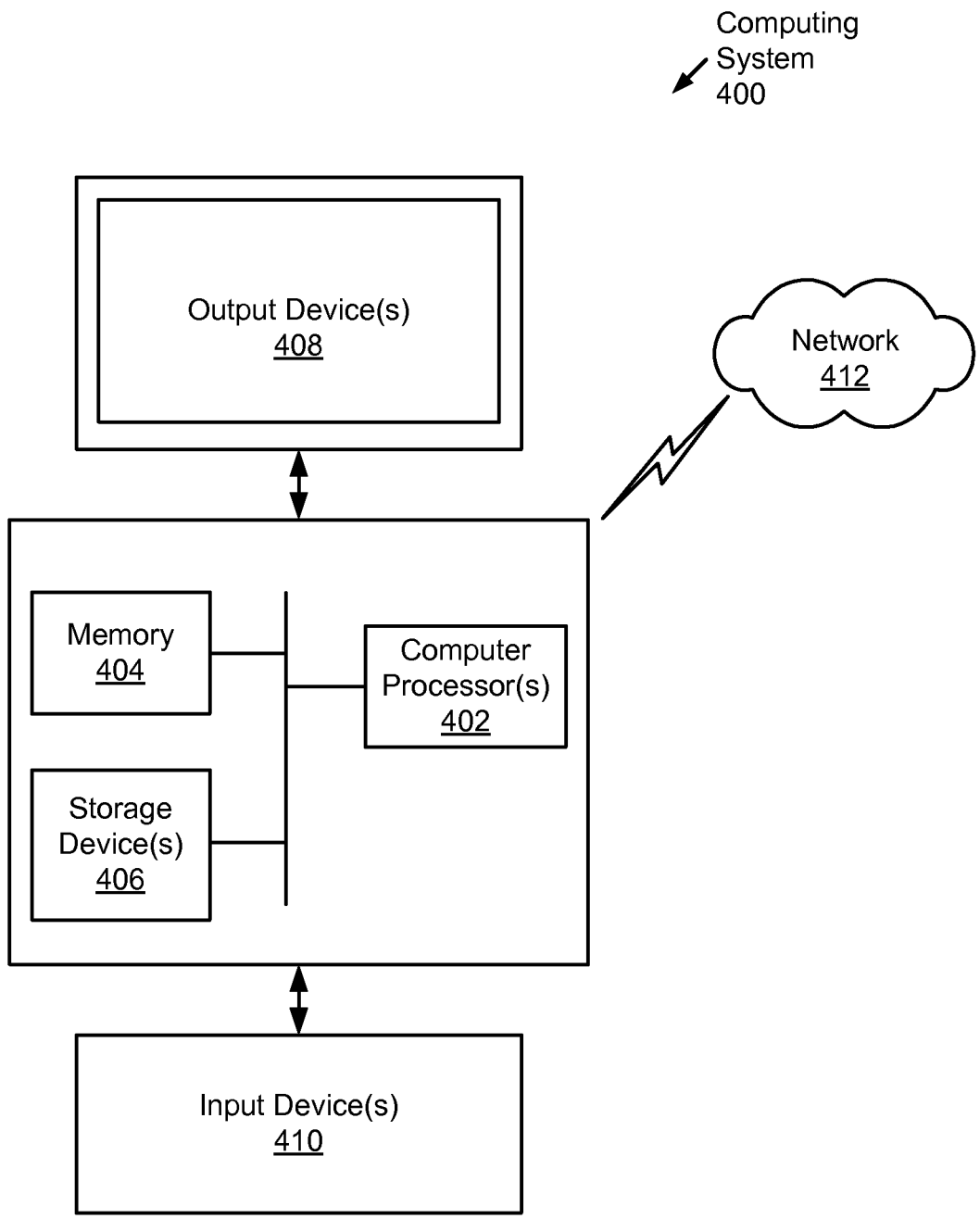
FIG. 4 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor (s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by the processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for visualizing a codebase comprising:
   receiving a dependency graph of the codebase, wherein the dependency graph comprises a plurality of nodes and a plurality of dependencies between the plurality of nodes, wherein each of the plurality of nodes represents an object in the codebase;
   receiving an abstraction hierarchy of the codebase, wherein the abstraction hierarchy comprises a plurality of abstraction levels;
   generating, based on the dependency graph and the abstraction hierarchy, a hierarchical graph;
   positioning each of the plurality of nodes on a code map using the hierarchical graph one abstraction level of the plurality of abstraction levels at a time, wherein positioning each of the plurality of nodes on the code map comprises:
      assigning a radius to each of the plurality of nodes based on a pre-determined measure of a corresponding object in the codebase;
      determining, based on a pre-determined algorithm, an energy to represent relative positioning of the plurality of nodes on the code map, wherein the energy comprises:
         an attraction energy proportional to a first distance between a first pair of nodes in the plurality of nodes; and
         a repulsion energy inversely proportional to a second distance between a second pair of nodes in the plurality of nodes, wherein the repulsion energy is increased by an additional amount in response to a sum of radii of the second pair of nodes exceeding the second distance; and
      adjusting the relative positioning of the plurality of nodes to reduce the energy;
   generating at least one surface for the code map,
      wherein the at least one surface comprises a portion of the plurality of nodes, and
      wherein the surface is contiguous; and
   rendering the code map.

2. The method of claim 1, further comprising:
   dividing the at least one surface into a plurality of regions, wherein each region of the plurality of regions comprises a single node of the plurality of nodes.

3. The method of claim 2, further comprising:
   dividing each of the plurality of regions into subregions, wherein each subregion is proportional to a target area of at least one child node of the single node.

4. The method of claim 3,
   wherein the positioning of each of the plurality of nodes uses an energy minimization approach, and
   wherein the plurality of regions are divided using a Voronoi treemap.

5. The method of claim 1, wherein the at least one surface comprises a plurality of circles each centered on a node of the plurality of nodes.

6. The method of claim 1,
   wherein rendering the code map comprises pre-rendering the code map into a single tile for a first level of zoom, and
   wherein rendering the code map comprises pre-rendering the code map into four tiles for a second level of zoom.

7. The method of claim 6, wherein rendering the code map further comprises overlaying information on the single tile.

8. A system for visualizing a codebase comprising:
   a server comprising:
      a computer processor,
      a data repository storing the codebase, and
      a memory, the memory storing instructions for a codebase visualization application, which, when executed by the computer processor, comprises functionality to:
         receive a dependency graph of the codebase, wherein the dependency graph comprises a plurality of nodes and a plurality of dependencies between the plurality of nodes;
         receive an abstraction hierarchy of the codebase, wherein the abstraction hierarchy comprises a plurality of abstraction levels;
         generate, based on the dependency graph and the abstraction hierarchy, a hierarchical graph;
         position each of the plurality of nodes on a code map using the hierarchical graph one abstraction level of the plurality of abstraction levels at a time, wherein positioning each of the plurality of nodes on the code map comprises:
assigning a radius to each of the plurality of nodes based on a pre-determined measure of a corresponding object in the codebase;
determining, based on a pre-determined algorithm, an energy to represent relative positioning of the plurality of nodes on the code map, wherein the energy comprises:
an attraction energy proportional to a first distance between a first pair of nodes in the plurality of nodes; and
a repulsion energy inversely proportional to a second distance between a second pair of nodes in the plurality of nodes, wherein the repulsion energy is increased by an additional amount in response to a sum of radii of the second pair of nodes exceeding the second distance; and
adjusting the relative positioning of the plurality of nodes to reduce the energy;
generate at least one surface for the code map,
wherein the at least one surface comprises a portion of the plurality of nodes, and
wherein the surface is contiguous; and
render the code map.

9. The system of claim 8, the instructions further comprising functionality to:
divide the at least one surface into a plurality of regions, wherein each region of the plurality of regions comprises a single node of the plurality of nodes.

10. The system of claim 9, the instructions further comprising functionality to:
divide each of the plurality of regions into subregions, wherein each subregion is proportional to a target area of at least one child node of the single node.

11. The system of claim 10,
wherein the positioning of each of the plurality of nodes uses an energy minimization approach, and
wherein the plurality of regions are divided using a Voronoi treemap.

12. The system of claim 8, wherein the at least one surface comprises a plurality of circles each centered on a node of the plurality of nodes.

13. The system of claim 8,
wherein rendering the code map comprises pre-rendering the code map into a single tile for a first level of zoom, and
wherein rendering the code map comprises pre-rendering the code map into four tiles for a second level of zoom.

14. The system of claim 13, wherein rendering the code map further comprises overlaying information on the single tile.

15. A non-transitory computer-readable medium (CRM) storing a plurality of instructions for visualizing a codebase, the plurality of instructions comprising functionality to:
receive a dependency graph of the codebase, wherein the dependency graph comprises a plurality of nodes and a plurality of dependencies between the plurality of nodes;
receive an abstraction hierarchy of the codebase, wherein the abstraction hierarchy comprises a plurality of abstraction levels;
generate, based on the dependency graph and the abstraction hierarchy, a hierarchical graph;
position each of the plurality of nodes on a code map using the hierarchical graph one abstraction level of the plurality of abstraction levels at a time, wherein positioning each of the plurality of nodes on the code map comprises:
assigning a radius to each of the plurality of nodes based on a pre-determined measure of a corresponding object in the codebase;
determining, based on a pre-determined algorithm, an energy to represent relative positioning of the plurality of nodes on the code map, wherein the energy comprises:
an attraction energy proportional to a first distance between a first pair of nodes in the plurality of nodes; and
a repulsion energy inversely proportional to a second distance between a second pair of nodes in the plurality of nodes, wherein the repulsion energy is increased by an additional amount in response to a sum of radii of the second pair of nodes exceeding the second distance; and
adjusting the relative positioning of the plurality of nodes to reduce the energy;
generate at least one surface for the code map,
wherein the at least one surface comprises a portion of the plurality of nodes, and
wherein the surface is contiguous; and
render the code map.

16. The non-transitory CRM of claim 15, the instructions further comprising functionality to:
divide the at least one surface into a plurality of regions, wherein each region of the plurality of regions comprises a single node of the plurality of nodes.

17. The non-transitory CRM of claim 16, the instructions further comprising functionality to:
divide each of the plurality of regions into subregions, wherein each subregion is proportional to a target area of at least one child node of the single node.

18. The non-transitory CRM of claim 17,
wherein the positioning of each of the plurality of nodes uses an energy minimization approach, and
wherein the plurality of regions are divided using a Voronoi treemap.

19. The non-transitory CRM of claim 15, wherein the at least one surface comprises a plurality of circles each centered on a node of the plurality of nodes.

20. The non-transitory CRM of claim 15,
wherein rendering the code map comprises pre-rendering the code map into a single tile for a first level of zoom, and
wherein rendering the code map comprises pre-rendering the code map into four tiles for a second level of zoom.

* * * * *